Patented May 9, 1950

2,507,479

UNITED STATES PATENT OFFICE 2,507,479

DYESTUFFS OF THE ANTHRAQUINONE ACRIDONE SERIES

Fritz Max, Easton, Pa., and David I. Randall, Phillipsburg, N. J., assignors to General Aniline & Film Corporation, New York, N. Y., a corporation of Delaware No Drawing. Application December 22, 1945, Serial No. 637,036

10 Claims. (Cl. 260—277)

This invention relates to new dyestuffs of the anthraquinone acridone carbazole series and to a process of preparing the same.

It is an object of this invention to provide new vat dyestuffs possessing desirable shades and valuable dyeing characteristics.

It is a further object to provide a process of preparing the same.

Other objects of the invention will become apparent as the description proceeds.

Our new compounds are anthraquinone 2.1-N-1'.2'-N-acridone carbazoles of the general formula:

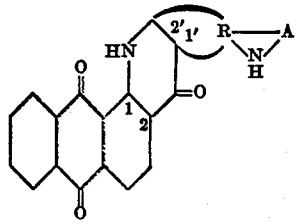

where R is an armoatic nucleus fused at the 2',1'-position and selected from the benzene or naphthalene nuclei of the formulas:

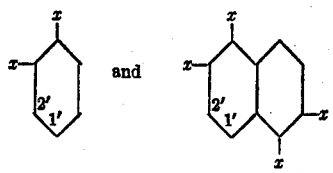

A is an anthraquinone benzacridone nucleus of the formula:

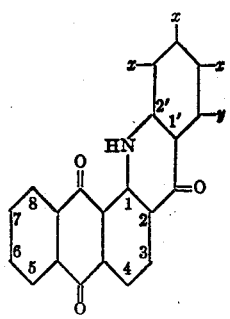

which in one of the positions 3.4, 5.6 or 7.8 forms a carbazole ring with the NH group and the nucleus R; $x$ is hydrogen, alkyl, alkoxy, aryloxy or halogen and $y$ is hydrogen, alkyl, alkoxy and and aryloxy.

The starting materials for the preparation of these dyestuffs are anthraquinone benzene and naphthalene acridones of the formula:

1. 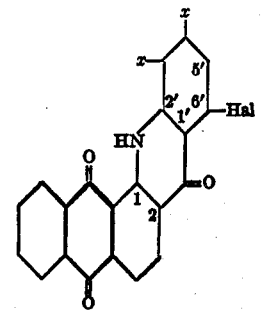

or

2. 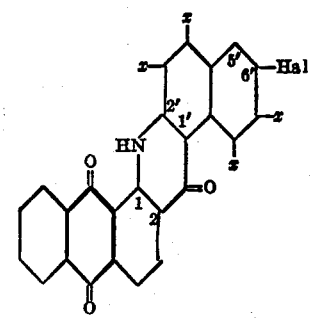

wherein $x$ has the significance aforesaid, Hal is halogen and the 5' position is free or occupied by a group which does not hinder ring closure, for example, halogen, and an amino-anthraquinone benzacridone of the formula:

3. 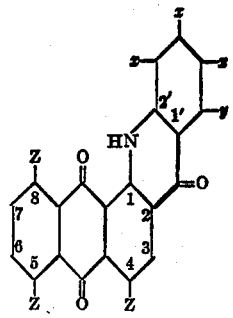

wherein $x$ has the significance aforesaid, $y$ is hydrogen, alkyl, alkoxy and aryloxy and one of the positions marked Z contains an amino group.

The starting materials under Formulas 1 and 2 may be prepared as described in U. S. P. 2,078,996. Those under Formula 3 may be made by various known methods, for example, compounds in which the amino group is in 4 position can be made by first reacting 1-amino-4-bromo-2-anthraquinone sulfonic acid with anthranilic acid or the corresponding substituted anthranilic acid, followed by subsequent ring closure and simultaneous removal of the SO3H group.

We have found that when a component of Formula 1 or 2 is reacted with a component of Formula 3 by heating in naphthalene, dry nitrobenzene or other suitable anhydrous diluent in the presence of a copper condensing agent, e. g., finely divided copper or a copper salt such as copper acetate or cuprous chloride, and an anhydrous acid-binding agent, e. g., anhydrous soda ash, anthrimides are generally obtained, which dye vegetable fibers from a caustic-hydrosulfite bath mostly gray to green shades depending on the nature of the substituents in the benzene or naphthalene nuclei. The dyeings obtainable from these anthrimides, containing the imino group attached to the 6' position of the aromatic nucleus R and the 4, 5 or 8 position of the anthraquinone nucleus A, show poor fastness to chlorine.

We have further found that when these anthrimide dyestuffs are heated with an anhydrous aluminum chloride condensing agent, e. g., at a temperature of about 60 to 150° C., vat dyestuffs possessing good fastness properties and corresponding to the above general formula are obtained. As condensing agents there may be employed, for example, aluminum chloride-sodium chloride or aluminum chloride-sulfur dioxide. Where products are desired which dye clear bright corinth to navy blue shades, it has been found advantageous to use a nitrobenzene solution of the anhydrous aluminum chloride for the ring closure.

The action of the condensing agent in this treatment of the anthrimides is to cause closure to a carbazole ring of the aromatic nucleus R with the imino group and the anthraquinone benzacridone nucleus A. In respect to the aromatic nucleus R this takes place in the 5' position, whereas with the anthraquinone benzacridone nucleus A, closure may take place in the 3, 6 or 7 positions, respectively, depending on whether the imino group is attached to the nucleus A in the 4, 5 or 8 positions.

It has also been found that dyestuffs of good fastness properties and corresponding to the above general formula may be obtained without the separation of the intermediate anthrimides and subsequent treatment thereof with an anhydrous aluminum chloride condensing agent. This may be accomplished in one and the same operation by heating to condensation and carbazole ring closure, e. g., at a temperature of above 190° C., a component of Formula 1 or 2 wherein the benzene or naphthalene nucleus is substituted in 3' position by an aryloxy group, e. g., the phenoxy group, with a component of Formula 3 in dry nitrobenzene in the presence of a copper condensing agent, e. g., finely divided copper or a copper salt such as copper acetate or cuprous chloride and an anhydrous acid-binding agent, suitably anhydrous soda ash.

The invention is further illustrated by the following specific examples, to which, however, it is not intended that it be limited. Parts are by weight.

*Example 1*

13 parts of anthraquinone 2.1-N-1'.2'-N-3',6'-dichlorobenzacridone, 13.5 parts of anthraquinone 2.1-N-1'.2'-N-4-amino-4' - chlorobenzacridone, 4 parts of anhydrous powdered soda ash, 1 part of copper acetate and 170 parts of naphthalene are heated together 3 hours at 210° C. while stirring. The condensation product precipitates during the heating period. After cooling to 120° C., the reaction mixture is diluted with 190 parts of chlorobenzene, filtered at 70° C., and washed successively with chlorobenzene, alcohol, dilute hydrochloric acid and water. The anthrimide obtained dyes greenish gray shades from a violet vat.

15 parts of the anthrimide condensation product are added to a solution of 60 parts of anhydrous aluminum chloride in 240 parts of dry nitrobenzene. The solution is stirred at 90-100° C. for 1 hour. During the course of the reaction the color changes from green to greenish blue.

The melt is poured into water acidified with HCl and the nitrobenzene removed by steam distillation. The dyestuff is filtered, stirred with 5% caustic soda solution and a small amount of sodium hypochlorite and refiltered. It has the probable formula:

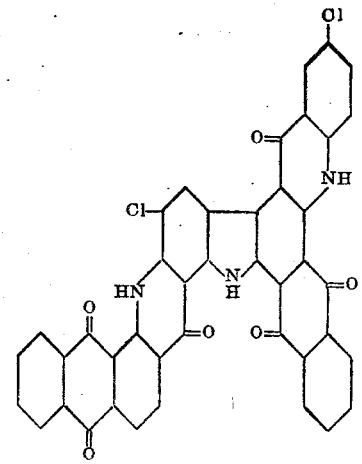

and is a dark powder dissolving in concentrated sulfuric acid with a red violet coloration. It dyes vegetable fibers from a red violet vat powerful corinth shades of excellent fastness properties.

*Example 2*

Proceeding as in Example 1, but employing anthraquinone 2.1-N-1'.2'-N-4-amino benzacridone in place of the 4'-chlor derivative thereof, a dyestuff similar in construction and properties but somewhat redder in shade is obtained.

*Example 3*

12.8 parts of anthraquinone 2.1-N-1'.2'-N-3'-methyl-6'-chlorobenzacridone, 13.5 parts of anthraquinone 2.1-N-1'.2'-N-4-amino-4'-chlorobenzacridone, 5 parts of anhydrous powdered soda ash, 1 part of copper acetate and 180 parts of dry nitrobenzene are heated at 205-210° C., for 4 hours with stirring. The anthrimide condensation product is filtered at 70° C. and washed successively with alcohol, dilute hydrochloric acid and water. From a violet vat greenish gray shades are obtained which are of insufficient fastness properties.

20 parts of the anthrimide obtained are added to a solution of 60 parts of anhydrous aluminum chloride in 240 parts of dry nitrobenzene. The solution is stirred at 90–95° C. for 1 hour and the dyestuff worked up as in Example 1. It has the probable formula:

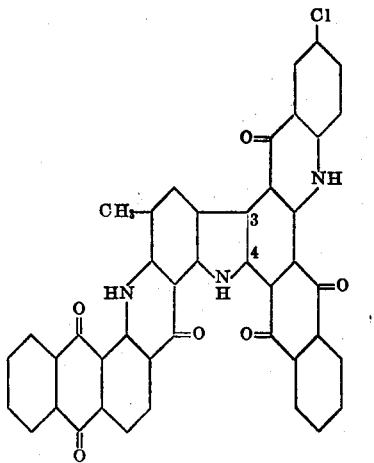

and dissolves in concentrated sulfuric acid with violet red coloration. From a violet brown vat it dyes strong red violet shades of excellent fastness properties. The dyeings are fast to water spotting.

*Example 4*

6.5 parts of anthraquinone 2.1-N-1'.2'-N-3'-methoxy-6'-chlorobenzacridone, 6.2 parts of anthraquinone 2.1-N-1'.2'-N-4-amino-4'-chlorobenzacridone, 2.4 parts of anhydrous soda ash, 0.5 part of copper acetate and 120 parts of dry nitrobenzene are heated together at 210° C. for 4 hours with stirring. During the heating period the condensation product precipitates. The dark crystalline anthrimide product is isolated by filtration at the pump, and washed successively with alcohol, dilute HCl and water. It dyes green shades from a violet vat.

8.5 parts of the anthrimide condensation product are introduced into a solution of 25 parts of anhydrous aluminum chloride dissolved in 120 parts of dry nitrobenzene. The blue green solution is stirred at 70° C. for 1 hour. The dyestuff is then worked up as in Example 1. It has the probable formula:

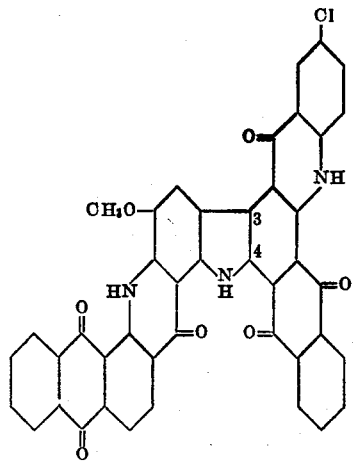

and is a dark violet powder which dissolves in concentrated sulfuric acid with a violet coloration. From a brown violet vat it dyes fast navy blue shades.

The preparation of vat dyestuffs in accordance with the invention wherein condensation and carbazolation occur without the assistance of anhydrous aluminum chloride is illustrated by the following specific example, parts being by weight.

*Example 5*

7.2 parts of anthraquinone 2.1-N-1'.2'-N-4-amino-4'-chlorobenzacridone, 11 parts of anthraquinone 2.1-N-1'.2'-N-3'-phenoxy - 6' - chlorobenzacridone, 4.1 parts of powdered anhydrous soda ash, 0.5 part of copper acetate and 140 parts of dry nitrobenzene were heated together at 210° C. for 4 hours with stirring. The product was isolated by filtering at 70° C. and washed successively with nitrobenzene, alcohol, dilute hydrochloric acid and water. The dyestuff has the probable formula:

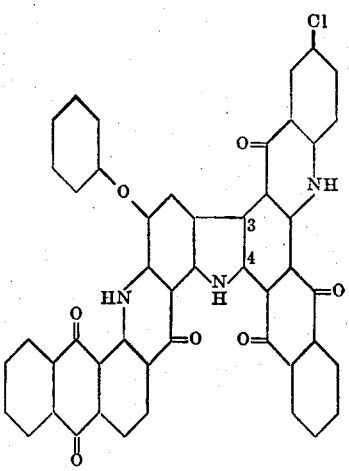

and is a dark powder dissolving in concentrated sulfuric acid with a violet coloration. From a red violet vat it gives red violet dyeings which possess very good fastness properties.

As various other embodiments of the invention will occur to those skilled in the art, it is not intended that the scope of the patent be limited except as is required by the prior art and the appended claims.

We claim:

1. An anthraquinone acridone carbazole of the formula:

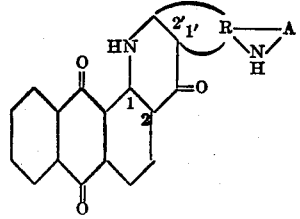

wherein R represents an aromatic nucleus fused at the 2',1'-position and selected from the group consisting of the benzene and naphthalene nuclei of the formulas:

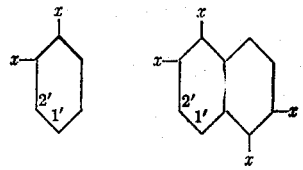

A represents an anthraquinone benzacridone nucleus of the formula:

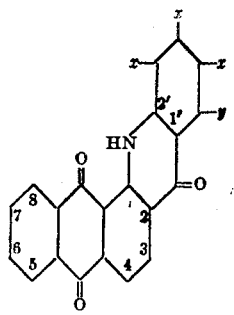

$x$ represents a radical selected from the group consisting of hydrogen, alkyl, alkoxy, aryloxy and halogen and $y$ represents a radical selected from the group consisting of hydrogen, alkyl, alkoxy and aryloxy, said nucleus A being in a position selected from the group consisting of the 3.4, 5.6 and 7.8 positions and forming a carbazole ring with the NH group and the nucleus R.

2. An anthraquinone acridone carbazole as defined in claim 1, wherein the anthraquinone benzacridone nucleus A, in the 3.4 position thereof, forms part of the carbazole ring.

3. An anthraquinone benzacridone carbazole of the formula:

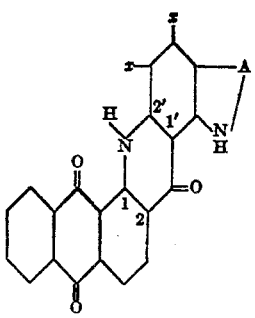

wherein A represents an anthraquinone benzacridone nucleus of the formula:

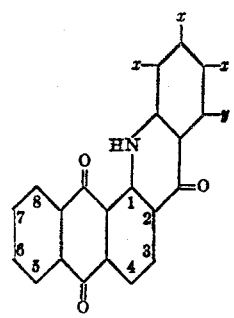

$x$ represents a radical selected from the group consisting of hydrogen, alkyl, alkoxy, aryloxy and halogen and $y$ represents a radical selected from the group consisting of hydrogen, alkyl, alkoxy and aryloxy, said nucleus A being in a position selected from the group consisting of the 3:4, 5:6 and 7:8 positions and forming part of the carbazole ring.

4. An anthraquinone benzacridone carbazole as defined in claim 3, wherein the nucleus A, in the 3.4 position thereof, forms part of the carbazole ring.

5. The anthraquinone benzacridone carbazole of the formula:

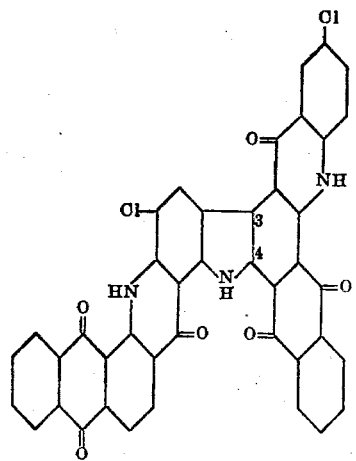

6. An anthraquinone benzacridone carbazole of the formula:

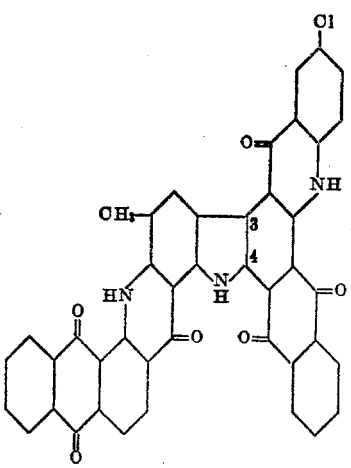

7. The anthraquinone benzacridone carbazole of the formula:

8. The anthraquinone benzacridone carbazole of the formula:

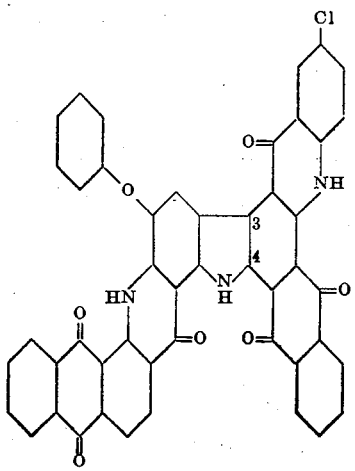

9. A process of preparing an anthraquinone acridone carbazole which comprises heating to condensation and ring closure an anthraquinone acridone selected from the group consisting of those of the formulas:

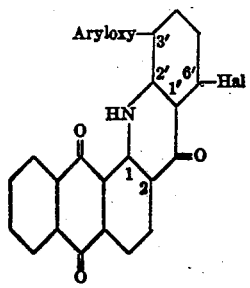

and

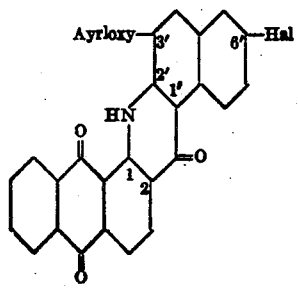

with an amino anthraquinone benzacridone of the formula:

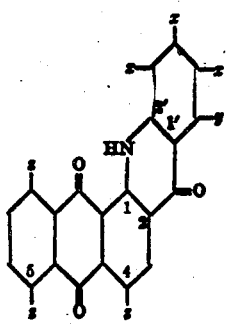

wherein Hal means halogen, $x$ represents a radical selected from the group consisting of hydrogen, alkyl, alkoxy, aryloxy and halogen, $y$ represents a radical selected from the group consisting of hydrogen, alkyl, alkoxy and aryloxy, and one of the positions marked Z contains an amino group, in the presence of dry nitrobenzene, a copper condensing agent, and an anhydrous acid-binding agent.

10. A process of preparing an anthraquinone acridone carbazole which comprises heating to condensation and ring closure an anthraquinone acridone selected from the group of those of the formulas:

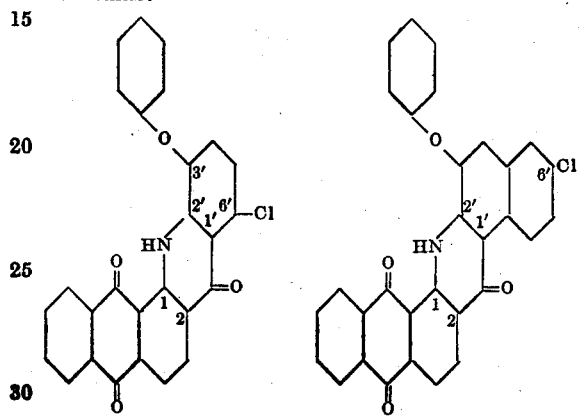

with an amino-anthraquinone benzacridone of the formula:

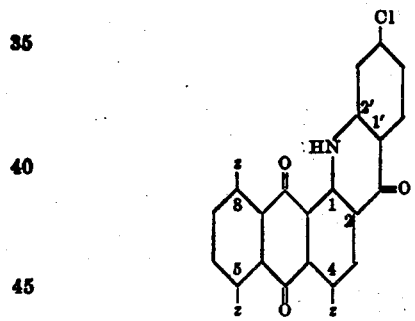

wherein one of the positions marked Z contains an amino group, in the presence of dry nitrobenzene, a copper condensing agent and an anhydrous acid-binding agent.

FRITZ MAX.
DAVID I. RANDALL.

REFERENCES CITED

The following references are of record in the file of this patent:

UNITED STATES PATENTS

| Number | Name | Date |
|---|---|---|
| 1,944,986 | Kranzlein et al. | Jan. 10, 1934 |
| 1,969,210 | Dettwyler et al. | Aug. 7, 1934 |
| 2,078,996 | Bauer (1) | May 4, 1937 |
| 2,086,843 | Bauer (2) | July 13, 1937 |
| 2,238,209 | Bauer (3) | Apr. 15, 1941 |
| 2,267,139 | Schlichenmaier et al. | Dec. 23, 1941 |